Jan. 22, 1957 T. DANNEVIG 2,778,371
VALVE STRUCTURE
Filed July 22, 1955 2 Sheets-Sheet 1

INVENTOR.
TORD DANNEVIG
BY
Reynolds, Beach & Christensen
ATTORNEYS

Jan. 22, 1957 T. DANNEVIG 2,778,371
VALVE STRUCTURE
Filed July 22, 1955 2 Sheets-Sheet 2

INVENTOR.
TORD DANNEVIG
BY Reynolds, Beach + Christensen
ATTORNEYS

United States Patent Office 2,778,371
Patented Jan. 22, 1957

2,778,371

VALVE STRUCTURE

Tord Dannevig, Seattle, Wash., assignor to Boeing Airplane Company, Seattle, Wash., a corporation of Delaware Application July 22, 1955, Serial No. 523,665

10 Claims. (Cl. 137—82)

This invention relates to a valve structure of the type intended to control a hydraulic (or other) fluid such as is used in hydraulic control systems.

The valves presently employed in this field, which are both mechanical-hydraulic and electro-hydraulic in nature, comprise generally a flapper type valving member used in conjunction with one or with two nozzles having fixed orifices, arranged in a system to constitute a hydraulic potentiometer, or to form a hydraulic Wheatstone bridge. In such valves, the normal spacing between the nozzle and the flapper is of the order of .001" to .002", and the total travel of the flapper corresponding to the full range of the amplifier is of the order of .0005" to .001". The input force on the flapper is either applied mechanically, such as in a host of measuring devices used in industry for the control of processes, or such force may be electro-magnetically applied, as is the case in a number of contemporary electro-hydraulic servo control valves. The latter are used in special aeronautical installations. In the latter case, the flapper also performs the function of an armature in the relay or torque motor that comprises the electrical input stage of the amplifier. The fluid used in the output stage may be hydraulic oil or air or any other suitable fluid, but is usually oil.

Flapper-nozzle devices of the nature described above have a number of disadvantages. Because of the small distances and travels involved, the accuracy required must be of a high order. Not only is accuracy of manufacture required, but accuracy of assembly and of adjustment, and exactitude of matching like parts, such as two opposed nozzles. All such requirements make such valves of extremely high cost, yet otherwise they will not function properly. Such valves of a size no greater in any dimension than a few inches cost several hundreds of dollars. This is so because of the large number of man hours of highly skilled workmanship that is required to produce and inspect the individual parts, subassemblies, and the final assembly of each such valve, and the high rate of rejection for inaccuracy.

It is a primary object of the present invention to provide a new valve structure for use in such hydraulic potentiometers or hydraulic bridge amplifiers that can be made in large quantities at relatively low cost, and quickly. Thus, not only is the cost of the valve and of the special installation (in which several may be required) greatly reduced, but the ability to produce such valves in quantity, and, consequently, to produce the special installations in which they are required, is greatly improved and speeded up.

In addition to the initial problem of attaining the requisite accuracy is the problem of maintaining the required accuracy in spacings in flapper-nozzle valves of the type heretofore available. It is an operational disadvantage of the conventional flapper-nozzle amplifier that repeated impact of the flapper upon the nozzle edge effects deformation of the nozzle tip, and causes a change in the nozzle-flapper discharge coefficient, and changes the gain and zero reference of the amplifier. It may also cause dynamic instability. Such deformation occurs if, for example, an excessive input signal is introduced to the flapper, or, particularly in servo valves, if the electric power is turned on before hydraulic pressure is established, although the latter is the preferred procedure in electro-hydraulic systems. It is a further object of this invention to provide a valve structure for use in such applications as have been mentioned that is rugged and not susceptible to wear or damage such as will cause change of operational characteristics due to overexcitation or similar causes.

Another disadvantage inherent in most electro-hydraulic amplifiers of the flapper type is that the electro-magnetic torque motor is mounted close to the nozzles, and exhaust oil from the nozzles circulates around the torque motor. Small ferrous particles in the oil are thus given an opportunity to settle out on the torque motor pole pieces. The accumulation of such particles over a period of time causes malfunction of the torque motor. It is another object of this invention to provide a valve structure for such use that inherently permits isolation of the hydraulic fluid from the input member of the hydraulic stage, and so avoids any such difficulties.

Flapper-nozzle valves of the type heretofore used are capable of controlling no more than two opposite and related nozzles. It is an object of the present invention to provide a single valve structure that can be used for the purpose of simultaneously and independently amplifying several (at least two) mechanical inputs, each having two opposite valve ports or orifices angularly related to each other, by means of two hydraulic pressure bridges.

By the use of the present valve, used as a passive spring-restrained seating valve or flow restrictor, the same can be made to exhibit a variety of pressure-flow characteristics depending upon dimensional parameters, direction of flow, and choice of outlet port. Among such characteristics are pressure-flow curves that are very nearly linear, as well as one that provides initial increase in flow with increase in pressure, but with further increase in pressure exhibits a negative flow-pressure curve. Such properties are brought about by the effect of valve pressure drop on the position of the spring-loaded valving member that determines the valve opening.

Still a further object of this invention is to provide such a valve structure in which there is no frictional effect associated with the movement of the valving member or closure.

With the above objects in view, and others as will appear more fully hereinafter, the present invention comprises the novel valve structure which is shown diagrammatically in various representative forms in the accompanying drawings, and the principles of which will be more fully explained hereinafter, and the novel features whereof will be defined in the claims at the end of this specification.

The several figures of the drawings are all more or less diagrammatic in nature, and in particular the clearances are, for the most part, greatly exaggerated.

Figure 8:
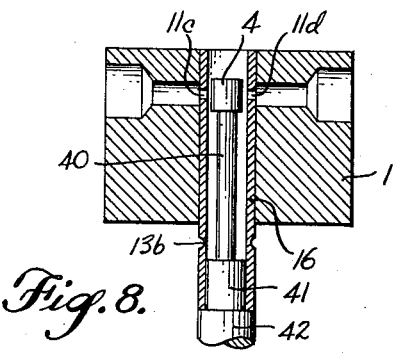
Figure 8 is also an axial sectional view through a valve structure in which a tubular sleeve is most directly associated with the closure member and its supports, and furnishes a means of supporting the assembly as a unit in the valve body.
Figure 9:
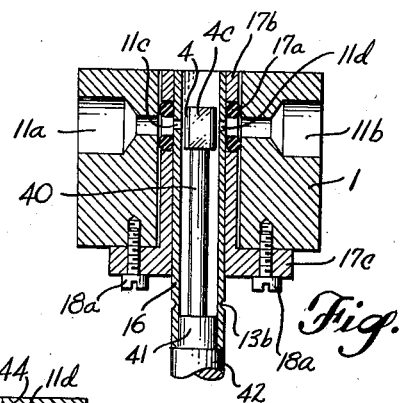
Figure 10:
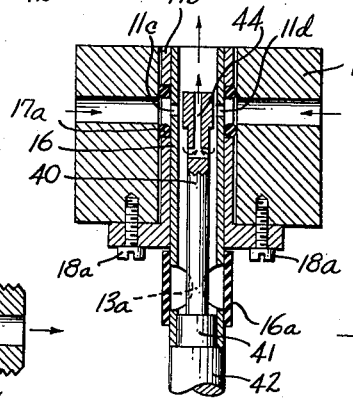

Figures 9 and 10 each illustrates similar embodiments to the same end as the form of Figure 8.

Figure 11:
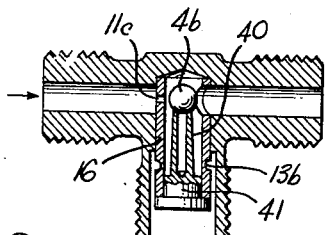

Figure 11 is a similar axial sectional view showing the valve structure applied to the design of a flow restrictor, in this case, a linear or quasi-linear restrictor with pressure-flow characteristics similar to the conventional single-orifice spring-restrained seating valve of the prior art.

Figure 12:
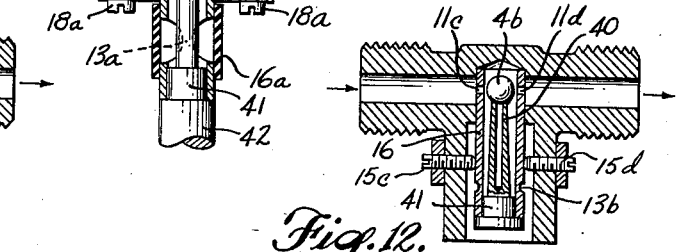

Figure 12 is an axial sectional view illustrating a spring-restrained double orifice seating valve where the positioning of the valve closure and its stem between the two orifices under the influence of the valve flow reaction force and the opposing flexure force gives rise to an initially rising but ultimately descending flow-pressure characteristic.

Figure 14:
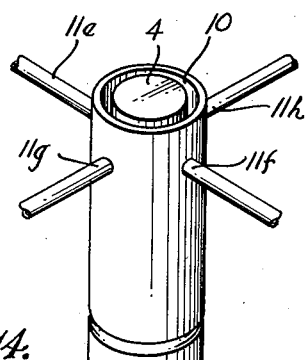
Figure 13:
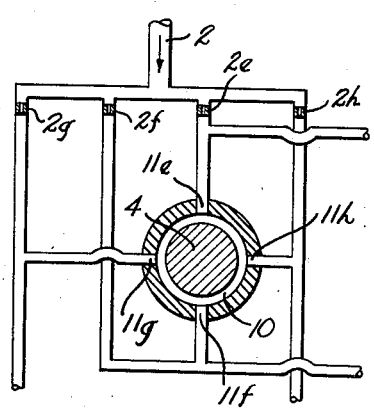

Figure 14 is an isometric view of the valve structure of this invention as adapted for use in a two-dimensional mechanical-hydraulic amplifier with four valving orifices for connection in pairs to two separate hydraulic bridge circuits, having a common supply and drain connections, and Figure 13 is a transverse sectional view of the same, taken at the plane of the several orifices.

Certain of the illustrations show particular details which are not shown in other illustrations. It is desired to make clear that such features may well be used in association with forms other than those with which they are shown, and their omission in these other illustrations is primarily to simplify the several illustrations, rather than an indication of unsuitability to such other forms.

Reference has been made hereinabove to the difficulty of attaining the requisite high degree of accuracy in former valves of the flapper-nozzle type, and to the high degree of accuracy which can be attained with the valve structure of the present invention. Primarily, the accuracy of the present valve structure is attained by the simple expedient of making at least the critical surfaces as surfaces of revolution. A main valve body or a tubular element, which is, in effect, a part thereof but inserted therein, is formed with a main bore of circular cross-section, preferably of the same diameter throughout. The valve closure member is formed also as a body of circular cross-section, likewise preferably of the same diameter throughout, and is mounted upon a reed or stem (the word "stem" will be used herein to avoid any implication that it is flexible), also preferably having a circular and uniform cross-section, but not necessarily so, which stem at a point distant from the closure member is formed with a mounting element, likewise formed as a body of circular cross-section, also of uniform diameter by preference, and usually of a size and shape to fit snugly and closely within the main bore of the valve body or within the tubular element previously referred to, the bore whereof is a substitute for the main bore. The valve ports or orifices (there may be only one or there may be two, or several arranged in pairs) are arranged to intersect the main bore in apposition to the closure member. These need not be of circular cross-section, but certain advantages are achieved when they are, especially when the ports are arranged in pairs opposite one another. Finally, the element which permits flexure may be a groove or necking down of the valve body, also about an axis coincident with that of the stem.

The reason for utilizing circular and preferably uniform cross-sections in the instances referred to above is that circular cross-sections are capable of manufacture easily and quickly by boring, turning, or grinding operations, or even in automatic screw machinery, with great accuracy, that is, with an accuracy not attainable with elements of other cross-sections, or with elements that must be made and assembled, of other forms, and so the requisite accuracy is easily, simply and quickly attainable at low cost. Expressed somewhat differently, all functional hydraulic and mechanical parameters are embodied as diameters, these including the valve body and its main bore, the cross bores where necessary, the valve closure member and its mounting means, and the spring means. All are bodies of revolution or modified bodies of revolution. Herein lies one of the most important producibility properties of this invention, by virtue of the fact that the diameter is the easiest dimension to maintain accurately in production.

Figure 1:
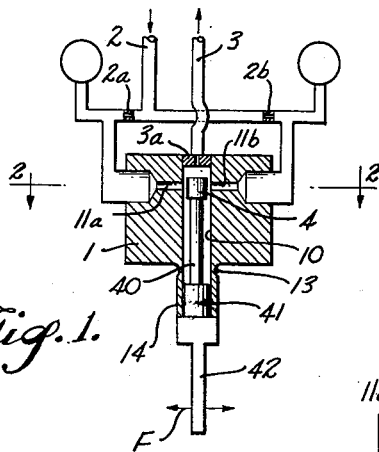
Figure 1 is an axial section through the valve structure, illustrating the basic principles thereof applied in a hydraulic pressure bridge amplifier.
Figure 2:
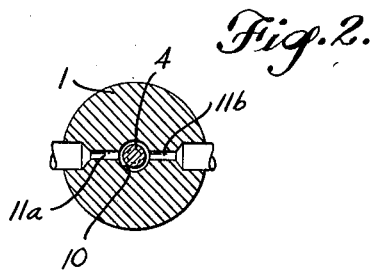
Figure 2 is a transverse sectional view of the same, on the line indicated at 2—2 in Figure 1.

Referring to Figures 1 and 2, the stationary part of the valve structure includes a valve body 1, having a main bore 10 of circular cross-section. In the particular form of Figure 1, cross-bores 11a and 11b intersect the main bore 10 to define ports, these being also of circular cross-section, and being formed by boring straight through and across the main bore 1 with the same drill or reamer. These ports 11a and 11b are connected, externally of the valve body 1, to the remainder of the balanced circuit of a hydraulic bridge, which bridge includes the restrictions 2a and 2b in opposite branches off the main pressure inlet 2, and a return line 3 communicating with the main bore past the restriction 3a.

A rigid stem 40, preferably of cylindrical cross-section and appreciably smaller than the main bore 1, is received therein and carries rigidly at one end a cylindrical mounting member 41 which fits snugly within and closes one end of the main bore 10. At its opposite end, or, at any rate, at a point distant from the mounting member 41, the stem 40 carries a rigid and integral valve closure member 4, located in apposition to the ports 11a and 11b, of cylindrical cross-section slightly less than the cross-section of the main bore 10 in which it is located. While Figure 1 (and all other figures) shows an appreciable gap between the closure member 4 and the wall of the main bore 10, it will be understood that this gap is so shown exaggeratedly for convenience of illustration, and that in a hydraulic amplifier of the nature described the gap would be of the order of .001" to .003" at either side when the closure member is centralized.

It is preferred that the stem 40, the mounting means 41, and the closure member 4 be formed integrally as parts of one element, and that all be turned, ground, or otherwise formed, simultaneously. The stem 40 is not flexible, but rigid, and is rigid with the mounting element 41 and the closure 4. In addition, externally of the stem, the same is formed with or there is secured to it an actuator 42, which constitutes a means whereby a mechanical or electrical force F may be impressed upon the stem, tending to deflect the same.

In the form shown in Figure 1, the portion of the valve body in which the mounting member 41 is received is formed as a projecting nipple 14, and this nipple, adjacent its function with the main body 1, or in any event intermediate the mounting member 41 and the body 1, is necked down as indicated at 13, or is otherwise made flexible while still remaining an integral part of the valve body 1. This may be accomplished by cutting a groove 13 coaxially with the main bore, so that, again, all critical dimensions are circular diameters and coaxial.

With the accuracy attainable by careful machining operations, using the axis of the bore 10 as a datum, the several parts may be readily assembled so accurately in most cases that the closure 4 is accurately located and centralized between the two ports 11a and 11b, and consequently controls pressure-flow relations through the two ports identically (or differentially to the extent that the design may so require). If, however, a force, as indicated at F, is applied to the actuator 42 (and it will be noted that such a force may be wholly isolated from any fluid within the valve body), such a force will effect flexure at the flexible means 13, and because of the extreme minuteness of the gap between the closure member 4 and the ports 11a and 11b, and the length of the stem, such a force F will effect approach of the closure 4 toward one such port 11a or 11b, and recession of the closure from the other such port. In consequence, the balance as between the branches of the pressure line 2 that includes the restrictions 2a and 2b is upset, and the result is reflected in changed pressures upstream of 11a and 11b. This alteration in the pressures, i. e. in the differential pressure upstream of the valve structure, can be made use of to effect necessary control action or the like, in known manner.

Because of the very minuteness of the dimensions involved, and the extreme accuracy attainable in such a simple way by the construction described and thus diagrammed in Figures 1 and 2, the actual movement need be of very small amplitude. Nevertheless, it is readily possible to effect movement of the closure 4 far enough to close either of the ports 11a or 11b, and because of the very slight difference in diameter between the closure 4 and the bore 10 and because the ports 11a and 11b are smaller than the main bore 10, which they intersect, the closure 4 will, for all practical purposes, effect closure of the one port in the circumstance just indicated.

With respect to the closure member 4, the axial overlap beyond the dimensions of the ports 11a and 11b is nominally the smallest dimension which will always give a positive overlap in the complete assembly within the dimensional tolerances required. With respect to the diameter of the closure 4, this is chosen with respect to the diameter of the bore 10, so as to give a radial clearance with a centralized closure consistent with the desired pressure balance in the hydraulic pressure bridge. This radial clearance corresponds to the gap between the nozzle and the centered flapper in the known nozzle-flapper arrangement.

The manner of inserting and securing the mounting member 41 within the main bore 10 or within the entrance of the nipple 14 may be any that is suitable, having in mind the accuracy required. It may be merely pressed into place, or soldered, brazed, or welded into place. By reason of the circular cross-sectional shapes of the several parts, the difficulties associated with the accurate location of nozzles are overcome in the present valve structure. This can be readily accomplished to satisfactory tolerances on mass production machinery. By virtue of the coaxial assembly of the valve bore, stem 40 and its associated parts, and the flexible means 13, the closure is inherently lined up in a position in the center between the two valving orifices 11a and 11b. These two orifices can be reamed conjointly with the same reamer before assembly, thus providing inherent matching of the two valving orifices, a problem which was of considerable moment with the nozzles in the nozzle-flapper arrangement. Such matching is necessary in a hydraulic amplifier of this type in order to maintain linearity and gain symmetry, and is obtained in the conventional arrangement only by careful selective assembly and expensive inspection of individual nozzles.

Figure 3:
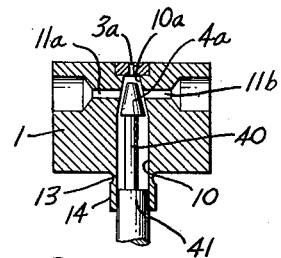
Figures 3 and 4 are views of the valve structure per se corresponding to Figure 1, but showing modifications in the shape of the closure member, and related parts.
Figure 4:
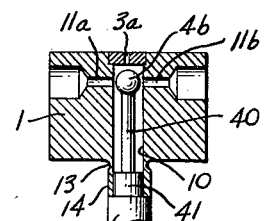

Figures 3 and 4 are diagrams of a valve similar to that shown in Figures 1 and 2, but with slightly changed closure members. Thus, in Figure 3, the closure member 4a is frustoconical in shape, and so has slightly better characteristics for matching exactly the complementally shaped portion 10a of the main bore. In Figure 4, the closure member 4b is of spherical shape, which, again, gives good control characteristics with respect to the ports 11a and 11b, and minimizes the effect of changes in fluid viscosity, such as might be due to temperature changes.

The operational features of the valve structure shown in these views, and in the somewhat more elaborate forms later to be described, are the same as for the conventional nozzle-flapper arrangement. A deflection of the stem in the plane through the axis of the valving orifices 11a and 11b causes an increase in the hydraulic resistance at the one valving orifice, the one which is being closed, and a decrease in hydraulic resistance at the other valving orifice. This, in turn, gives rise to, respectively, an increase and decrease in pressures upstream of the two valving orifices, the so-called chamber pressures. The differential pressure between the two chambers comprises the primary amplifier output and is normally applied across a spring-restrained piston which provides the mechanical output of the amplifier. An important feature of the present valve structure is the property that the hydraulic reaction force exerted on the stem, due to differential chamber pressure acting thereon in the region of the valving orifices, is proportional to differential chamber pressure. Conversely, then, an input force applied to the stem at F will be linearly converted into a differential chamber pressure proportional to the input force. The downstream orifices, such as that at 3a, are normally not shown in the literature pertaining to such valves, but are required in order to maintain a constant discharge coefficient at the valving orifices, respectively. This discharge coefficient tends to vary with back pressure in small orifices of the nature used in hydraulic amplifiers of this type, and failure to maintain always the back pressure above a critical ratio with respect to upstream pressure, results in erratic and/or unstable operation of the amplifier.

Figure 5:
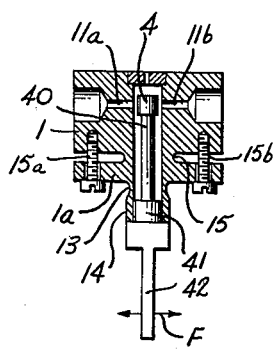
Figure 5 is a view of the valve body similar to Figures 3 and 4, but illustrating how the most extreme accuracy in zero balance or initial setting may be readily attained in such a valve structure.

While the arrangements of Figures 1 to 4, inclusive, will, in many instances, produce acceptable values of hydraulic-amplifier zero balance, there may be instances, especially with mass-produced parts, where it is desired to attain a higher degree of accuracy in such zero balance. The arrangements of Figures 5, 6, and 7 permit this. In Figure 5, which otherwise resembles the form of Figure 1, the valve body intermediate the flexible means 13 and the orifices 11a and 11b is further necked down or otherwise made flexible, as indicated at 15. This permits a certain degree of flexibility, of which advantage can be taken by forces reacting between this portion at 1a and the main valve body at 1. For instance, a pair of adjusting screws 15a and 15b, located in the plane of the orifices 11a and 11b, serve to displace the portion 1a outwardly of the neck 15, even though by minute amounts, yet this is sufficient to more precisely centralize the stem 40 and the closure 4. The action of the adjusting screws at 15a and 15b does not in any sense disturb the spring action at 13, nor the position with respect to the nipple 14 of the mounting member 41. These continue to function as already described.

Figure 6:
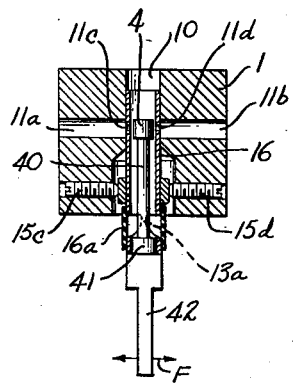
Figures 6 and 7 are views corresponding to Figure 5 and showing additional ways in which zero balance may be attained or adjusted.

In the form shown in Figure 6, a tube 16 is fitted within the main bore 10, so that when in place it becomes, in essence, a part of the main bore, but it projects at one end from the valve body 1, and in the intervening or projecting portion is to a degree flexible, and so can be adjusted by the adjusting screws 15c and 15d, reacting between the projecting portion of this tube 16 and the valve body 1. In this form the mounting member 41 is mounted in the projecting end of the tube 16, while the ports 11c and 11d are formed in the tube 16 in registry with the cross-bore 11a, 11b. The tube 16 in its projecting portion may be notched, as indicated at 13a, to constitute the primary flexible means, and the interruption to the continuity of the tube 16 may be restored to maintain fluid-tightness of the tube by a section of flexible hose 16a.

Figure 7:
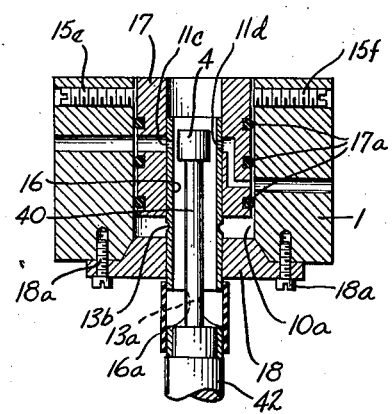

In Figure 7, the tube 16 is snugly secured in part within a sleeve 17 received loosely within the enlarged main bore 10a and sealed therein at 17a, and in part the tube 16, past the flexible means at 13b, is rigidly held within a cap 18, which is secured at 18a to the valve body 1. By the provision of adjusting screws 15e and 15f, acting upon the sleeve 17, zero balance is attained by slight lateral deflection of that portion of the tube 16 which includes the orifices 11c and 11d, while the portion of the tube beyond the flexible means at 13b is held rigid with the valve body 1, which, as will be seen, is the reverse of the arrangement in Figure 6.

Figure 8 reverts to the simple form of Figure 1, modified primarily in that it includes a tube 16 in which the stem, its mounting means and the closure 4, are preliminarily mounted as a sub-assembly, after which the same is assembled within the valve body 1. This permits the tube 16 to be made from suitable spring material, such as steel or beryllium copper, whereas the valve body 1 can be made from another material, to satisfy considerations such as weight.

Another embodiment is shown in Figure 9, where the sleeve 17b is flanged at 17c and, in turn, mounts the tube 16 with its flexible means 13b. In other respects this arrangement is similar to that shown in Figure 7. It is to be noted in Figure 9 that the closure 4 is formed with a flat, or preferably with two flats, one at each side, as indicated at 4c, parallel to the axis of the cross-bores 11a and 11b. Incorporation of these flats will increase clearances on those parts of the valving element which are not used for metering, and provide less sensitivity to dirt particles in the oil.

Figure 10 illustrates an arrangement similar to that of Figure 9, except that the flexible or spring action is obtained by actually notching the tube 16, as indicated at 13a and as already described in conjunction with Figure 6, and in the further respect, that the fluid passage between the inside of the main bore and the closure 4 has been by-passed by drilled passages 44 inside the stem. This equalizes the downstream pressure seen by the various segments of the valving orifices and improves the performance of the valve by providing better hydraulic symmetry. By completely surrounding the valving member and spring with hydraulic fluid of the same pressure, such as in the embodiment shown in Figure 10, all errors due to differential pressure effect (Bourdon effect) on minute eccentricities in the stem spring assembly are eliminated.

Figure 11 shows an embodiment of the invention as applied to the design of a flow restrictor, in this case, a linear or quasi-linear restrictor with pressure-flow characteristics similar to the single-orifice spring-restrained seating valve of the art. A spherical closure 4b is used in this application, for reasons such as were mentioned in the description of Figure 4, namely, in order to minimize the effect of changes in fluid viscosity, due, for instance, to temperature changes on the coefficient of discharge of the restrictor. Except for the inclusion of the tube 16 and the use of a single valve port or orifice 11a, instead of two opposite ports, the arrangement of Figure 11 is quite similar to that of Figure 4. The desired pressure-flow characteristic is obtained by proper dimensioning of the valving orifice, of the initial radial clearance between valving element and main bore, and the spring constant of the flexure pivot at 13b. The stem and closure elements can be mass-balanced with respect to the neutral axis of the pivot, so as to make the device insensitive to linear accelerations and vibrations. This is particularly important in airborne applications and is a property that is difficult to obtain with any conventional configuration. This embodiment of the invention has extensive application as a damping element in hydraulic control systems.

Figure 12 shows an embodiment of a two-orifice spring-restrained seating valve with pressure-flow characteristics generally like those of a conventional two-nozzle-flapper valve. These characteristics are again obtained or modified by proper dimensioning of the valving orifices the flexure pivot gradient, and initial valve clearance, which, in the instance of Figure 12, is made adjustable in the manner illustrated in Figure 6, in accordance with computations of available orifice flow area with valving element position being influenced by valve pressure drop, effective seat area, and pivot spring constant. In such a form as this, the diameter of the respective valving orifices 11c and 11d may, if desired, be made different to obtain special characteristics. Again, this is a simple matter to accomplish by the use of properly dimensioned drills or reamers. The main application of this embodiment is as a supply orifice, and is particularly unique in that it permits the design of a restrictor with a negative characteristic, that is, one where flow increases with decrease in pressure and vice versa.

In Figures 13 and 14, the principles of the valve structure already explained are adapted for use in a two-dimensional mechanical-hydraulic amplifier. The main valve bore 10, in this arrangement, is equipped with four valving orifices 11e, 11f, 11g, and 11h, to which the supply connection 2 communicates past the respective restriction 2e, 2f, 2g, and 2h, which correspond to the restrictions 2a and 2b in Figure 1. These four valving orifices are connected in opposite pairs to two separate hydraulic bridge circuits having a common supply connection at 2 and a common drain connection (not shown). Such an arrangement constitutes a mechanical-hydraulic resolver. A mechanical force F1 acting on the input end 42 of the stem in a plane perpendicular thereto but non-coincident with the planes of the paired orifices will be vectorially resolved into two hydraulic signals F2 and F3 proportional to the components of force in the two major planes of operation of the valve structure as defined, the one by the orifices 11e and 11f and the other by the orifices 11g and 11h. These major planes of operation intersect at some angle less than 180° (in this instance at 90°) on the valve main bore axis. The valving orifice diameters are made small compared to the main bore diameter in order to avoid cross-talk or intermodulation between the two hydraulic amplifiers. This modification of the basic valve structure of this invention has application in the field of automatic machine tools, as the sensing element for hydraulic tracer controls, and, in general, as a two-dimensional instrument pick-off. The arrangement can naturally also be utilized to amplify two mutually independent input signals independently where space, weight or economy considerations make it desirable to let one valve structure perform the duty that would normally require two.

I claim as my invention:

1. A valve structure comprising a valve body having a main bore of circular cross-section, a smaller cross-bore substantially axially intersecting said main bore, to define at least one port, a stem of a cross-section less than that of said main bore, means at one end of, coaxial with, and rigid with respect to said stem, having a circular cross-section and fitting snugly within said main bore to mount the stem coaxially within such main bore, a valve closure of a circular cross-section slightly less than that of the main bore, supported coaxially upon and rigid with said stem distant from said mounting means and apposite said port, and normally centralized within the main bore, and flexible means interposed between the valve body and the stem-mounting means, for lateral deflection of the stem and the closure from its centralized valve-open position into port-closed position, and vice versa, by application and relief of a deflecting force in the vicinity of said stem-mounting means.

2. A valve structure as in claim 1, including a second flexible means located intermediate the port and the stem-mounting means, and means reacting between the valve body and the stem-mounting means for initial adjustment of the latter, and of the stem and its valve closure to the centralized position by flexure of said second flexible means.

3. A valve structure as in claim 1, wherein the cross-bore is of circular cross-section, and traverses the main bore to define two diametrically opposite ports, whereby flexure of the flexible means in the sense to displace the centralized closure to close one such port correspondingly opens the other, and vice versa.

4. A valve structure as in claim 1, wherein the valve body is formed with a projecting nipple aligned with and including a portion of the main bore, the outer end of said nipple cooperating with and supporting the stem-mounting means, and the nipple being resiliently flexible intermediate said stem-mounting means and the valve body, to constitute the flexible means.

5. A valve structure as in claim 4, wherein the valve body is necked down intermediate the nipple and the cross-bore, to define a second flexible means, and means reacting across said second flexible means to flex the same for initial centralization of the closure within the main bore.

6. A valve structure as in claim 1, including a plurality of cross-bores in the valve body defining a plurality of ports relatively angularly displaced by less than 180°, and located apposite the closure, whereby displacement of the closure from its centralized position, by flexure of the flexible means, in a direction intermediate the axes of two adjoining ports varies the relative port openings in accordance with the angularity of such direction of displacement relative to the respective cross-bore axes.

7. A valve structure comprising a valve body having a main bore of circular cross-section, a cross-bore substantially axially intersecting said main bore, a tube received in and closing said main bore, projecting therefrom at one end, and formed with at least one port of smaller size than the main bore located in registry with the cross-bore, a stem of a cross-section less than that of the tube's bore, means at one end of, coaxial with, and rigid with respect to said stem, having a circular cross-section and fitting snugly within the projecting end of said tube to mount the stem coaxially within said tube's bore, a valve closure of a circular cross-section slightly less than that of the tube's bore, supported coaxially upon the rigid with the opposite end of said stem, apposite said port, and normally centralized within the tube's bore, the projecting portion of said tube being resiliently flexible, for lateral deflection of the stem and closure from its centralized position into port-closed position, and vice versa, by application and relief of a deflecting force in the vicinity of said stem-mounting means.

8. A valve structure as in claim 7, including means to fix one portion of the tube with relation to the valve body, and to leave another portion, other than the said resiliently flexible portion, free to flex laterally to a limited extent, and means reacting between the valve body and said limitedly flexible portion of the tube to flex the latter for initial centralization of the stem and its closure within the tube's bore, leaving the original resiliently flexible portion free to flex for closure and opening of the port.

9. A valve structure as in claim 7, wherein the projecting portion of the tube is notched, intermediate the stem-mounting portion and the portion within the main bore of the body, to define the resiliently flexible portion.

10. A valve structure as in claim 6, including a sleeve having a bore of circular cross-section to snugly receive the tube, itself received within the main bore of the valve body, and ported in registry with the tube's port and the cross-bore, means to seal sleeve within the main bore at opposite sides of the port, and means to secure said sleeve fixedly to the valve body.

References Cited in the file of this patent
UNITED STATES PATENTS
2,675,652     Chiappulini _____ Apr. 20, 1954